US006978631B2

(12) United States Patent
Fuller

(10) Patent No.: US 6,978,631 B2
(45) Date of Patent: Dec. 27, 2005

(54) DEHUMIDIFICATION SYSTEM

(76) Inventor: Andrew C. Fuller, 1253 Camp Buddy Rd., Ridgeville, SC (US) 29472

( * ) Notice: Subject to any disclaimer, the term of this patent is extended or adjusted under 35 U.S.C. 154(b) by 138 days.

(21) Appl. No.: 10/692,475

(22) Filed: Oct. 24, 2003

(65) Prior Publication Data
US 2005/0087612 A1 Apr. 28, 2005

(51) Int. Cl.[7] .......................... F25B 49/00; F25D 17/04
(52) U.S. Cl. ................. 62/176.6; 62/176.1; 236/44 A; 236/44 C
(58) Field of Search .......................... 62/176.1, 176.6, 62/125, 126, 129; 236/44 A, 44 C, 51

(56) References Cited

U.S. PATENT DOCUMENTS

| | | | | |
|---|---|---|---|---|
| 4,092,635 A | * | 5/1978 | Warner | 340/507 |
| 4,909,041 A | * | 3/1990 | Jones | 62/99 |
| 5,353,862 A | * | 10/1994 | Akiyama | 165/229 |
| 5,915,473 A | * | 6/1999 | Ganesh et al. | 165/222 |
| 6,427,461 B1 | * | 8/2002 | Whinery et al. | 62/176.6 |

* cited by examiner

Primary Examiner—Marc Norman
(74) Attorney, Agent, or Firm—Sara A. Centioni; William Y. Klett, III; Nexsen Pruet, LLC

(57) ABSTRACT

A dehumidification system including a controller having a humidity sensor switch that turns the dehumidifier, as well as the plurality of fans, on and off based on the ambient humidity of the area in which the dehumidification system is placed. Additionally, the dehumidification system includes a user interface unit that is separate from the dehumidifier, and that can be used to operate the dehumidification system from remote locations.

18 Claims, 5 Drawing Sheets

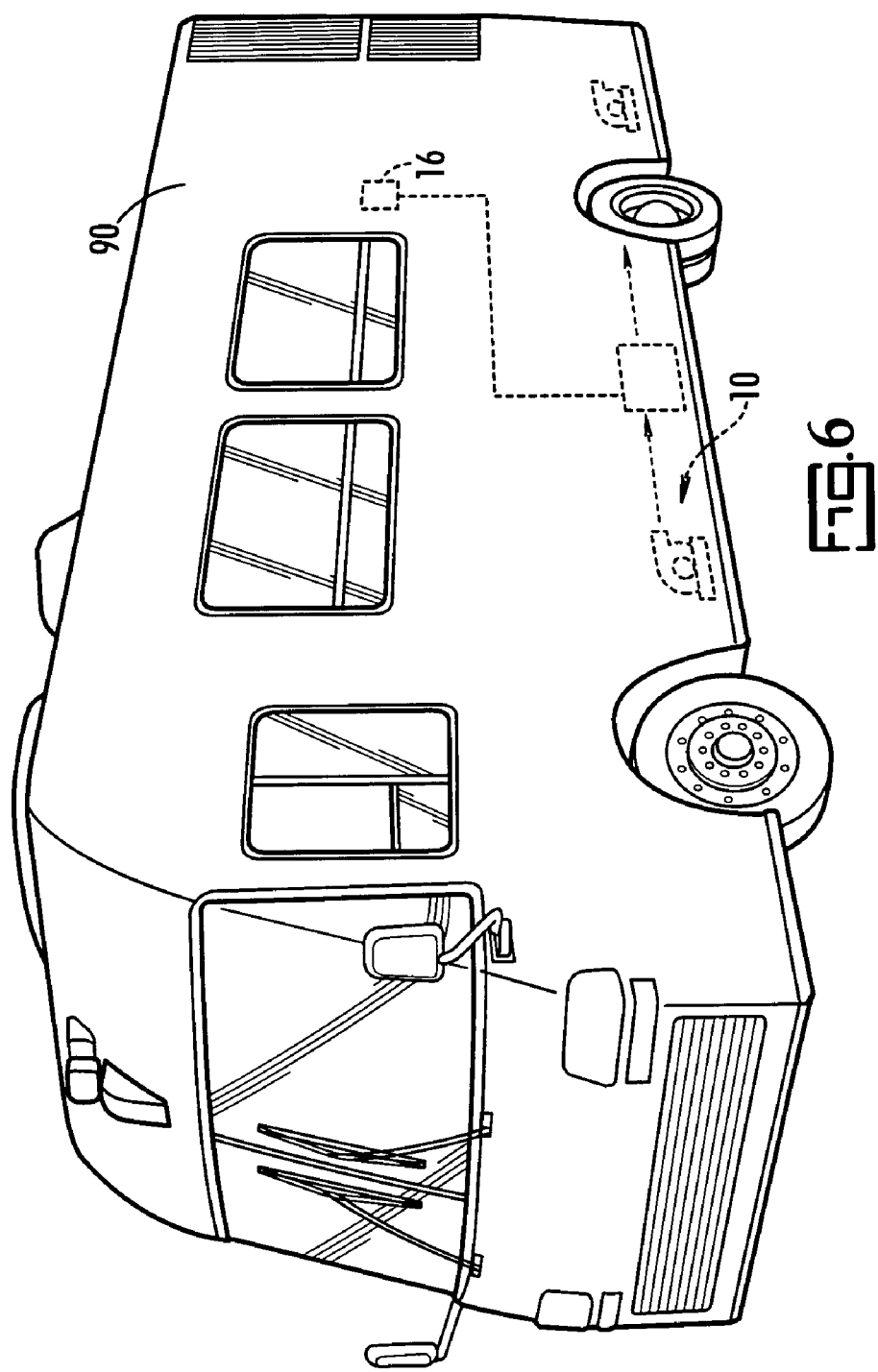

DEHUMIDIFICATION SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates to dehumidifiers, and, in particular, to dehumidifier controller systems that regulate ambient humidity of interior and enclosed spaces.

Appliances for removing moisture from enclosures or interior spaces are known to prevent these areas from becoming damaged. An area very susceptible to damage caused by moisture, such mildew and termite damage is the basement or crawl space of a house. Therefore, the ability for homeowners to maintain reduced moisture levels in the basement can be critical to preserve the structural integrity of the house, as well as to preserve the environment within the basement of the house.

Another area that is susceptible to moisture damage is the interior space of boats. In particular, the engine rooms and the interior cabins of boats that are stored at marinas can easily become mildewed, giving the boats a musty odor and damaging the materials of the boats.

Dehumidifiers are well known for use in removing moisture from the atmosphere. However, typical dehumidifiers require that a user operate the dehumidifier at the location of the unit itself. Further, the controller systems of dehumidifiers are such that the unit is either constantly running or constantly turned off. Therefore, if the user is not diligent in turning the unit on and off based on need, there is a risk that either energy will be wasted or that mildew and moisture damage will persist.

Accordingly, there exists a need for an effective and convenient dehumidification system for use in areas that are susceptible to moisture damage.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

According to its major aspects and briefly stated, the present invention is a dehumidification system including a dehumidifier that is connected to a plurality of fans. The system further includes a controller having a humidity sensor switch that turns the dehumidifier, as well as the plurality of fans, on and off based on the ambient humidity of the area in which the dehumidification system is placed. Additionally, the dehumidification system includes a user interface unit that is separate or remote from the dehumidifier, and that can be used to operate the dehumidification system from remote locations.

In an alternative embodiment, the controller of the dehumidification system unit further includes a wood moisture indicator switch. The wood moisture switch works in combination with the humidity switch so that the dehumidifier is turned on or off either by the wood moisture switch or the humidity switch depending on wood moisture and ambient humidity. The user interface includes a number of inputs, as well as a service light, which indicates a need for maintenance or repair.

A feature of the present invention is the use of a dehumidification system in interior or enclosed spaces such as the crawl space of a house and the engine room of a boat. Not only will the use of a dehumidifier in these areas reduce and prevent the musty odor caused by potential mildew, but also the materials used to construct houses and boats can be better preserved. Further, keeping these areas dry prevents the growth of pests that can be damaging to the area, such as termites.

Another feature of the present invention is the use of a user interface unit in combination with a dehumidifier. Typically, dehumidifiers must be operated at the location of the unit itself. Because areas such as the basement or crawl space of a house tend to be small and unfinished, placing a unit in these areas can be unpleasant burdensome on the user of the unit who is forced to constantly enter the basement to operate the unit. A user interface can avoid the need for entering these areas, so that a user can operate the dehumidifier in comfortable and convenient locations within the house.

Yet another feature of the present invention is the use of a dehumidifier in combination with a plurality of fans. Dehumidifiers tend to include fans within the unit so that moist air is circulated into the unit and dry air is circulated out of the unit. However, if the enclosed area to be dehumidified is relatively large, the dehumidifier may take a long time to dry the air. Through the use of a plurality of fans positioned in various locations around the dehumidifier, the moist air can be more effectively dried. Further, the fans contribute to the improvement of the environment of the interior space by circulating dried and fresh air.

Still another feature of the present invention is the use of a controller having an ambient temperature sensor wherein the dehumidifier is turned on or off based on a preset, desired humidity level. Accordingly, if the ambient humidity is higher than the desired humidity, the unit will be turned on, and if the ambient humidity is below the desired humidity, the unit is turned off. This switch allows the dehumidifier to remain energy and cost efficient. Further, the user need not monitor the dehumidification system once the desired humidity is programmed.

The use of a wood moisture switch in combination with a humidity switch is yet another feature of the present invention. By using a combination of switches, the dehumidifier can effectively eliminate and prevent moisture damage of the interior spaces. If the moisture contact is too high in the wood of the interior space, the dehumidifier is started. However, if only the moisture content of the air is too high, rather than the wood, then the dehumidifier is still turned on.

Yet another feature of the present invention is the use of a user interface having a service light. The service light alerts the user that the dehumidification system is in need of either maintenance or repair. Therefore, the lifespan of the dehumidifier can be prolonged, and its function enhanced.

Still another feature of the present invention is the use of a dehumidification system that negates the need to seal those interior spaces that are to be dehumidified. It is known that spaces, such as the basements and crawl spaces of houses, can contain levels of harmful gases, such as radon. If these spaced are completely enclosed for the sake of keeping out moisture, such gases can build up and create dangerous, harmful environments to the inhabitants of the house. The present system contributes to the circulation of fresh air throughout the space.

Other features and advantages of the present invention will be apparent to those skilled in the art from a careful reading of the Detailed Description of the Preferred Embodiments presented below and accompanied by the drawings.

BRIEF DESCRIPTION OF THE DRAWINGS

In the drawings,

FIG. 6 is a perspective view of an RV containing a dehumidification system according to the preferred embodiment of the present invention.

DETAILED DESCRIPTION OF THE PREFERRED EMBODIMENTS

Figure 1:
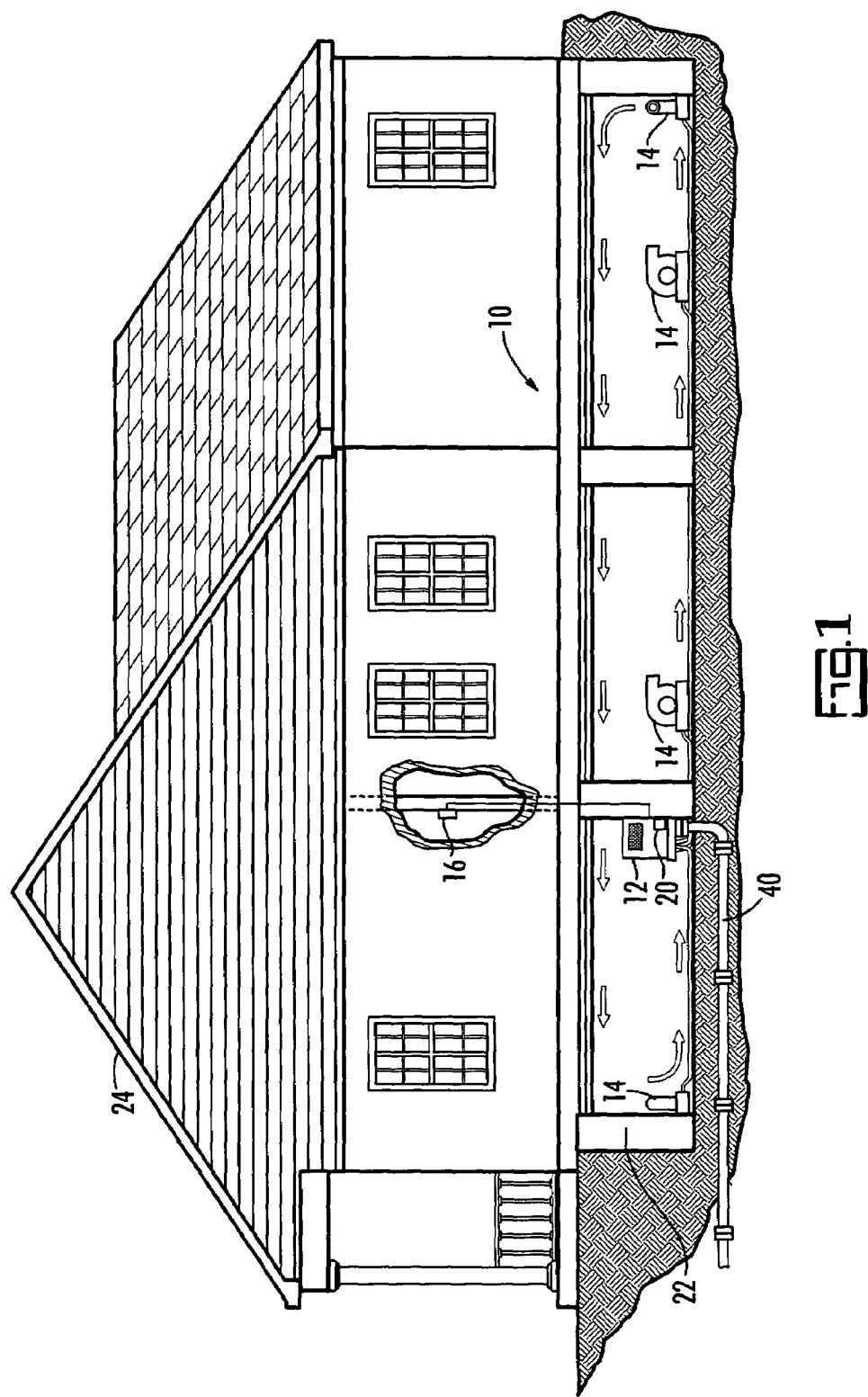
FIG. 1 is a cross-sectional side view of a house containing a dehumidification system according to a preferred embodiment of the present invention.
Figure 2:
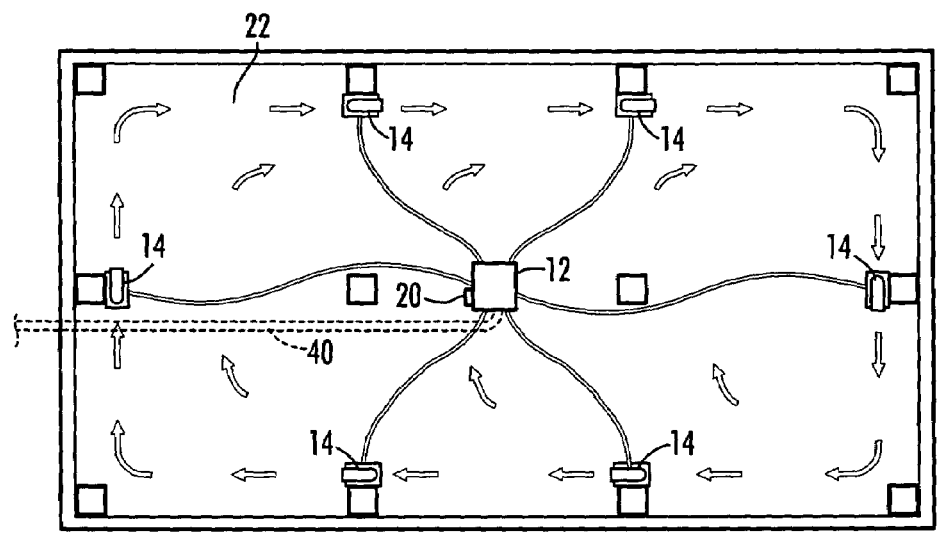
FIG. 2 is a top view of the crawl space of a house containing a dehumidification system according to the preferred embodiment of the present invention.

The present invention is a dehumidification system 10 for use in interior or enclosed spaces. As illustrated in FIGS. 1 and 2, the dehumidification system 10 includes a dehumidifier 12 that is connected to a plurality of fans 14 and a user interface unit 16. The system 10 is operated by a controller 20 that can be included either within the vicinity dehumidifier 12 or the user interface unit 16. Although the dehumidification system 10 is shown to be located within a crawl space 22 or basement of a house 24, it is contemplated by the present invention that the dehumidification system 10 can be used within any area of the house 24, as well as other enclosed areas, such as storage sheds, RVs, and boats.

Figure 3:
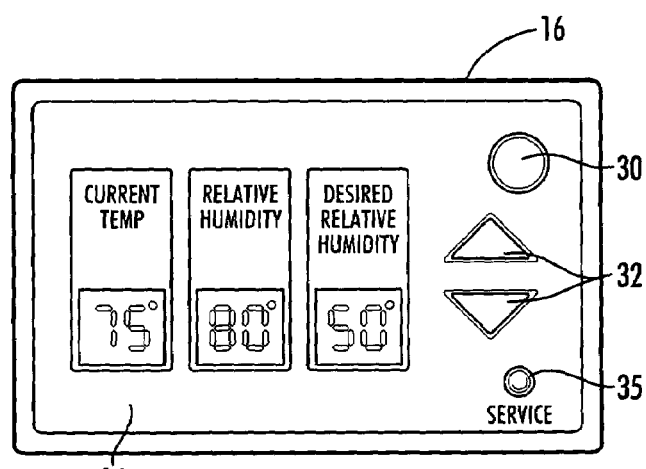
FIG. 3 is a front view of a user interface unit of a dehumidification system according to the preferred embodiment of the present invention.

A feature of the present invention is the user interface 16, which can be used to operate the dehumidification system from remote locations. As illustrated in FIG. 3, the user interface 16 can be located within the main portion of the house 24 and be electrically wired, or have a wireless connection, to the dehumidifier 12 that is in the crawl space 22 of the house 24. Preferably, the user interface unit 16 includes a power input 30 for manually turning the system 10 on or off and a means for selecting a desired humidity 32 by which a user can incrementally adjust up and down the desired humidity of the area in which the dehumidifier 12 is located. The user interface unit 16 further includes a display 34 showing the current temperature and relative humidity of the area containing the dehumidifier, as well as the desired relative humidity, that has been set by the user. Finally, the user interface 16 can include a service light 35 that indicates when the system 10 needs maintenance or repair.

As shown, all the components of the dehumidification system 10 can be electrically wired and can obtain power by plugging the dehumidifier into a GFI (ground fault interrupter) outlet. Alternatively, the dehumidification system 10 can be operated by remote control, wherein a transmitting device capable of transmitting signals, such as radio or microwave, communicates with a receiver so as to turn the dehumidifier 12 on or off. Therefore, the system 10 can be completely automated through these connections.

The dehumidifier 12 can include any conventional arrangement. A typical dehumidifier removes moisture from the air by condensing the moisture from the air on its cooled evaporator coils. In the present invention, the condensed moisture can be collected in a retainer beneath the dehumidifier 12, and as shown in FIGS. 1 and 2, the condensation can drain into a pipe 40 that is routed to the exterior of the interior or enclosed space. Although a variety of dimensions are suitable for the dehumidifier 12 depending on the particular location needing to be dehumidified, the dehumidifier 12 is preferably less then 20 inches if the dehumidifier 12 is to go into the basement or crawl space of a house. Further, the dehumidifier 12 can be permanently installed next the wall of an interior space needing to be dehumidified.

A particular feature of the present invention is the use of the dehumidifier 12 in combination with the plurality of fans 14 that are advantageously positioned around the area needing to be dehumidified. Through the use of plural fans positioned in various locations around the dehumidifier 12, the moist air can be more effectively dried. Further, the fans contribute to the improvement of the environment of the interior space by circulating dried and fresh air. Preferably, the fans will pull less than or approximately 2 Amps of energy. However, more powerful fans are contemplated by the present invention.

Figure 4:
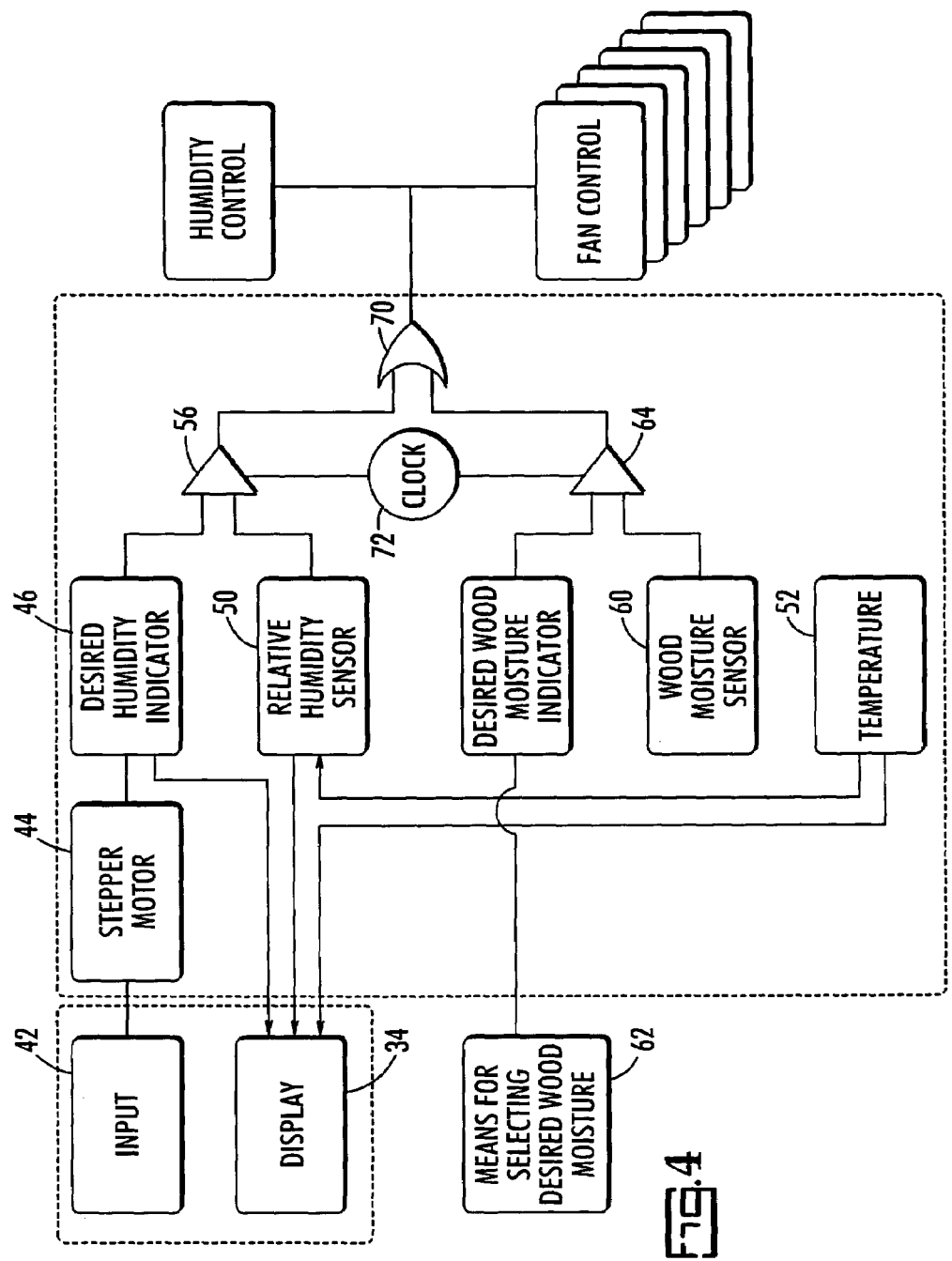
FIG. 4 is schematic view of the component parts of a dehumidification system according to the preferred embodiment of the present invention.

A schematic view of how the various components of the dehumidification system 10 operate is shown in FIG. 4. As illustrated, the user interface unit 16 includes an input section 42, including the power input 30 and the selecting means 32, in which a user can program the desired humidity by increasing or decreasing the humidity displayed on display 34. The user changes the desired humidity using a stepper motor 44 that allows the desired humidity to be changed in increments by sending signals to a desired humidity indicator 46.

The programmed or pre-selected desired humidity is compared with the relative ambient humidity, which is measured by a humidity sensor 50. The humidity sensor 50 can use any instrument for measuring atmospheric humidity, such as a hygrometer, and a thermometer 52, because relative humidity is temperature sensitive. The humidity sensor 50 measures the actual humidity of the area in which the dehumidifier 12 has been placed. The relative humidity is also displayed on the user interface unit 16. In operation, the desired humidity and the actual humidity are compared by a first comparator 56. If the relative humidity is greater than desired humidity, then the dehumidifier 12 and the plurality of fans 14 are turned on, and if the relative humidity is less than the desired humidity 12, then the dehumidifier 12 and the plurality of fans 14 are turned off. Because the dehumidification system 10 is completely automated, a user need simply program a desired humidity and the system will thereafter operate itself to maintain this desired humidity. In an alternative embodiment, each fan of the plurality of fans 14 can include a relative humidity sensor and a desired humidity indicator so that the fans can turn on independently of the system 10 and prevent the entire system 10 failing in the case one of the fans malfunctions.

As previously discussed, the dehumidification system 10 can also include a wood moisture sensor 60 that is used in combination with a humidity sensor 50. Although the system 10 need only contain one of these indicators, the use of a combination of indicators contributes to the prevention of moisture damage of the interior spaces containing the system 10. If the moisture content is too high in the wood of the interior space, dehumidifier 12 is started. However, if only the moisture content of the air is too high, rather than the wood, then the dehumidifier 12 will still be turned on. As with the humidity sensor 50, the actual wood moisture measured by the wood moisture sensor 60 is compared by a second comparator 64 to a pre-selected desired wood moisture, which is selected by a means for selecting a desired wood moisture 62, and depending on whether the actual wood moisture is higher or lower than the desired wood moisture, the dehumidifier 12 and the plurality of fans 14 are turned on or off. If the wood moisture sensor 60 and the humidity sensor 50 are used in combination, the system 10 preferably includes an "or" gate 70, wherein the information of the first comparator 56 and the information of the second comparator 64 is sampled by a clock 72 so that the dehumidifier 12 and the plurality of fans 14 will be turned on if either the humidity or the wood moisture require it.

The controller 20 of the system 10 can contain the sensor and indicator components, as illustrated in FIG. 4. However, it is also contemplated that the sensor and indicator components are removed from the controller 20 so that the controller need not remain in the vicinity of the dehumidifier 12.

The clock 72 of the system 10, in addition to driving the repetition of comparisons of humidity at short intervals, also indicates on the display 34 through the service light 35 a need for a maintenance or check up of the system 10 based on an preset maintenance intervals. Further, the service light 35 can also indicate that the system 10 is somehow malfunctioning and needs to be repaired. The service light 35 is advantageous because it serves a warning to the user of the system 10. Therefore, the lifespan of the dehumidification system 10 can be prolonged, and its function enhanced.

In an alternative embodiment, the dehumidification system is connected to a centrally located alarm system (not shown), similar to a burglar alarm system. Each component of the system 10 would be monitored by the alarm system so that if any one component or a combination of components malfunctioned, the alarm system would be triggered, and those monitoring the system would initiate repair.

Figure 5:
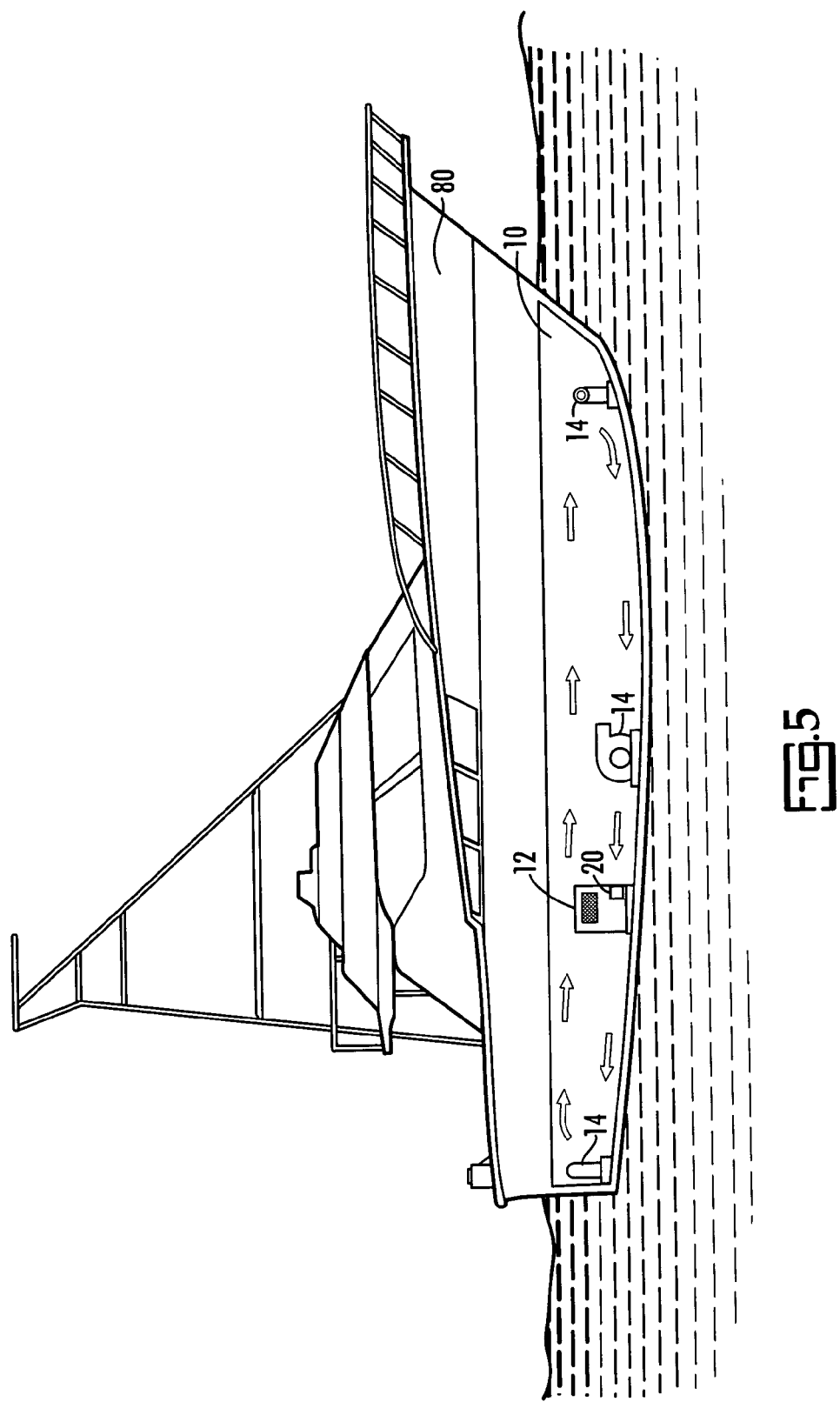
FIG. 5 is a cross-sectional side view of a boat containing a dehumidification system according to the preferred embodiment of the present invention.

FIG. 5 represents the dehumidification system 10 of the present invention in use in a boat 80. In particular, the dehumidification system can be used in the state rooms or the engine room of the boat 80. Another area to benefit from the use of the system 10 is in an RV 90, as illustrated in FIG. 6. Both of these vehicles include many enclosed areas that may be susceptible to moisture damage. Although the system 10 in FIGS. 5 and 6 is shown to include the plurality of fans 14, it is contemplated that the system 10 would not be required in these areas, or other small areas.

A feature of the present invention is the use of a dehumidification system 10 in interior or enclosed spaces. Accordingly, any area that tends to become musty and mildewed is suitable for the dehumidification system 10. Not only will the use of a dehumidification system 10 in these areas reduce and prevent the musty odor caused by potential mildew, but also the materials used in these areas can be better preserved.

Finally, there are many alternative embodiments and modifications of the present invention that are intended to be included within the spirit and scope of the following claims.

What is claimed is:

1. A dehumidification system, comprising:
   a dehumidifier;
   a user interface;
   a humidity sensor for determining relative humidity of an area;
   means carried by said user interface for selecting a desired humidity for said area;
   a wood moisture sensor for measuring the wood moisture in said area;
   means for selecting a desired wood moisture for said area; and
   a controller interconnected with said dehumidifier, said humidity sensor, said desired humidity selecting means, said wood moisture sensor, and said desired wood moisture selecting means, wherein said controller activates said dehumidifier when said relative humidity is higher than said desired humidity, and wherein said controller activates said dehumidifier when said actual wood moisture is higher than said desired wood moisture.

2. The dehumidification system as recited in claim 1, wherein said dehumidifier, said user interface, and said controller are connected by electrical wiring.

3. The dehumidification system as recited in claim 1, wherein said dehumidifier, said user interface, and said controller are connected by wireless connection.

4. The dehumidification system as recited in claim 1, further comprising a plurality of fans that are connected to said dehumidifier.

5. The dehumidification system as recited in claim 1, wherein said user interface unit includes a service light.

6. The dehumidification system as recited in claim 1, wherein said user interface unit includes a display, wherein said display shows said relative humidity, said desired humidity, and the temperature of said area.

7. The dehumidification system as recited in claim 1, wherein said user interface unit includes a power input.

8. The dehumidifier as recited in claim 1, wherein said controller activates said dehumidifier either when said relative humidity is higher than said desired humidity or when said wood moisture is higher than said desired wood moisture.

9. A method for maintaining the moisture level of an area at or below a pre-selected level, comprising:
   installing a dehumidifier;
   installing a user interface;
   installing a humidity sensor for determining relative humidity of an area;
   installing means for selecting a desired humidity for said area;
   installing a controller;
   installing a wood moisture sensor for measuring wood moisture; and
   connecting said dehumidifier, said user interface, said humidity sensor, said selecting means, said wood moisture sensor, and said controller, wherein said controller activates said dehumidifier when said relative humidity is higher than said desired humidity.

10. The method as recited in claim 9, further comprising installing at least one fan.

11. The method as recited in claim 10, further comprising connecting said at least one fan to said dehumidifier.

12. The method as recited in claim 9, further comprising installing means for selecting a desired wood moisture, wherein said controller activates said dehumidifier when said wood moisture is higher than said desired wood moisture.

13. The method as recited in claim 9, wherein said user interface has a display that is remote from said humidifier.

14. The method as recited in claim 13, wherein said display includes said selecting means.

15. The method as recited in claim 14, further comprising selecting a desired humidity.

16. The method as recited in claim 9, wherein said connecting step is done by wireless connection.

17. The method as recited in claim 9, wherein said connecting step is done by electrical wiring.

18. The method as reciting in claim 9, further comprising connecting said dehumidifier, said user interface, said humidity sensor, said selecting means, and said controller to an alarm system.

* * * * *